(12) United States Patent
Schmidt

(10) Patent No.: US 6,749,338 B2
(45) Date of Patent: Jun. 15, 2004

(54) ARRANGEMENT OF A COVER BAND ON A LINEAR GUIDE

(75) Inventor: Roland Schmidt, Riegelsberg (DE)

(73) Assignee: Ina-Schaeffler KG (DE)

( * ) Notice: Subject to any disclaimer, the term of this patent is extended or adjusted under 35 U.S.C. 154(b) by 39 days.

(21) Appl. No.: 10/280,297

(22) Filed: Oct. 24, 2002

(65) Prior Publication Data
US 2003/0081866 A1 May 1, 2003

(30) Foreign Application Priority Data
Oct. 26, 2001 (DE) .......................... 101 53 016

(51) Int. Cl.⁷ .............................................. F16C 29/06
(52) U.S. Cl. .......................................... 384/15; 384/45
(58) Field of Search ............................ 384/15, 44, 45, 384/49, 50, 55, 59

(56) References Cited

U.S. PATENT DOCUMENTS 5,622,433 A * 4/1997 Suzuki et al. ................. 384/45
6,502,988 B2 * 1/2003 Koch et al. .................... 384/15
6,629,779 B1 * 10/2003 Mischler et al. .............. 384/15

FOREIGN PATENT DOCUMENTS

| DE | 237805 | 7/1986 |
| DE | 19524810 | 1/1997 |
| EP | 0311895 | 4/1989 |
| EP | 1184584 | 3/2002 |

OTHER PUBLICATIONS

German Search Report.
"Aluminum–Taschenbuch", *Aluminum–Verlag GmbH*, Düsseldorf, Germany, 1974, 13.Aufl., pp. 926–927.

* cited by examiner

Primary Examiner—Thomas R. Hannon
(74) Attorney, Agent, or Firm—Ostrolenk Faber, Gerb & Soffen, LLP

(57) ABSTRACT

A cover band on a linear guide for closing holes that are provided for fastening screws of a guide rail. The cover band is inserted in a longitudinal groove of the guide rail and has an outer surface in the plane of a wiping surface of the guide rail. Two retaining strips on the cover band bear inside the longitudinal groove against those lateral groove walls and are locked together. The cover band is composed of an outer facing layer and an inner deformation layer. The inner layer contains the retaining strips. The outer and inner layers of the cover band are of two different materials, e.g., steel and aluminum, which are inseparably connected mechanically by cold roll bonding.

14 Claims, 1 Drawing Sheet

ARRANGEMENT OF A COVER BAND ON A LINEAR GUIDE

BACKGROUND OF THE INVENTION

The invention relates to arranging a cover band on a linear guide for closing holes in a guide rail which holes receive fastening screws.

Cover bands are used in linear bearing arrangements in which rolling-contact-body recirculation units are guided on profile rails. Such guide rails are used on machine tools. As the guide rails are parts which are subject to wear, they must be changed periodically. Therefore, they are often fastened to the machine frame with screws. The cover band covers the holes in the profile rails of linear guides in a flush manner. The cover band makes it considerably simpler and quicker to fit the rails. The cover band makes it unnecessary to close each individual hole.

To close the fastening screw holes of a guide rail, it is known to provide the guide rail with a groove-shaped recess aligned with the fastening holes. The cover band is appropriately inserted into the groove-shaped recess. Such arrangements are shown, for example, in prior art publications DD 237 805 A1 and EP 0 311 895 A1. The cover band is often adhesively bonded to the guide rail inside the groove-shaped recess. However, there is a risk that the adhesive bond may become loosened. The adhesive-bonding contact surface must then be cleaned in order to fit the cover band in the groove again. The adhesive-bonding technique for the cover band is meanwhile becoming increasingly less acceptable in general mechanical engineering and in machine tool building, because the cover bands, of many users often loosen under the effect of emulsions. Therefore, there have been complaints about this type of connection.

DE 195 24 810 A1 shows an arrangement of the type mentioned at the beginning in which the cover band consists of a top layer and a bottom layer fastened to the top layer. Two retaining strips are formed by regions which are bent at the two longitudinal sides of the bottom layer. This prior art does not indicate the way in which the two layers are fastened to one another. However, the adhesive-bonding technique, for example, is suitable for this. The top layer of the cover band bears inside the longitudinal groove against lateral bearing surfaces of the guide rail. These surfaces have been produced by milling webs, by setting the webs at an angle with press rollers and by subsequent grinding. This results in expensive manufacture. In addition, this cover band has no means of support on the guide rail in its center region inside the longitudinal groove. This has the risk that the cover band may bend and arch. As a result, the adhesive bonding of its layers and the sealing at its outer surface may be impaired.

SUMMARY OF THE INVENTION

The object of the invention is to develop a cover band which, primarily due to its shaping in combination with the shaping of a correspondingly configured rail groove, is held in the rail groove in a positive-locking and reliable manner.

The cover band is inserted in a longitudinal groove of the guide rail. The outer surface of the cover band is arranged in the plane of a wiping or outer surface of the guide rail. The guide rail has two retaining strips for the fastening. The retaining strips extend in the longitudinal direction of the guide rail and are arranged to bear inside the longitudinal groove against lateral groove walls of the guide rail which define the longitudinal groove. The cover band is comprised of an outer layer that acts as a facing layer and of an inner layer that acts as a deformation layer. The inner layer contains the retaining strips. It is also fastened to bear against the outer layer.

According to the invention, that the outer layer and the inner layer of the cover band are made of two different materials which are inseparably connected to one another mechanically by cold roll bonding.

In this case, the outer layer may be made of a corrosion-resistant steel and the inner layer may be made of pure aluminum. Each lateral groove wall of the guide rail may have an undercut of concave cross section for accommodating material of the inner layer.

The two longitudinal margins of the inner layer may be designed as lips. The cover band is first partly inserted into the longitudinal groove of the guide rail, and it can then be completely rolled into place. The lips of the inner layer are displaced into the undercuts of the guide rail and are shaped into retaining strips. However, it is also possible for the cover band to be snapped completely into the longitudinal groove of the guide rail. The two longitudinal margins of the inner layer are designed as retaining strips having arched portions, which are arranged in the undercuts of the guide rail to act as flexible snap lips.

The cover band of the invention is therefore made of two different materials, for example steel and aluminum, which are inseparably connected mechanically by cold roll bonding. On account of its homogeneity, the steel/aluminum composite is retained even during extreme shaping. A heat treatment (soft annealing) after the cold roll bonding makes it possible, on account of the non-overlapping temperature ranges during heat treatment of steel and aluminum, to act specifically on the material grade of the aluminum without reducing the desired strength of the outer layer acting as facing layer, which strengthens had been achieved by the cold working.

The high-strength corrosion-resistant steel X-10CrNi18-8 may be used for the facing layer. The material for the inner layer which acts as a deformation layer, may be of pure aluminum. Such an aluminum layer is used in a soft state if roll-in profiling is formed by non-cutting shaping in its cross section on both sides in the longitudinal direction of the cover band. In this variant, the cover band is inserted into the longitudinal groove of the guide rail, which is provided with an undercut. The band is rolled into the guide rail with a special rolling-in tool. In the process, load peaks occur during the rolling-in due to the projection of the lips. These load peaks cause the material lip to engage in the groove undercut toward the outside in a positive manner.

On the other hand, the inner layer made of pure aluminum is in a hard state when snap profiling is rolled into its cross section along both sides in the longitudinal direction of the cover band. Without auxiliary means, the cover band then snaps into the longitudinal groove of the guide rail due to this special profiling. The profiling in the cover band is configured such that a freely shaped snap lip can move in each case transversely to the longitudinal direction of the cover band. This snap lip then engages in the undercut of the rail groove.

The cover band according to the invention is reliably held in the guide rail by positive locking. This permits cost-effective manufacture. The cover band can be rolled up due to its simple and relatively narrow band cross sections. The cover band is corrosion-resistant due to the use of X-steel (chrome/nickel steel) and aluminum.

Other material combinations, for example, steel and copper, are also possible for use with the technology of cold roll bonding. In general, steel can be combined with materials which differ markedly from steel in their yield stress.

BRIEF DESCRIPTION OF THE DRAWINGS

Exemplary embodiments of the invention are shown in the drawing and are described below. In the drawing.

DETAILED DESCRIPTION OF PREFERRED EMBODIMENTS OF THE INVENTION

An arrangement according to the invention includes a guide rail 1 with a plurality of holes 2, arranged one after the other along the longitudinal direction of the rail, for receiving fastening screws. The holes and the screws in the holes are closed over the outside by a common cover band.

Figure 2:
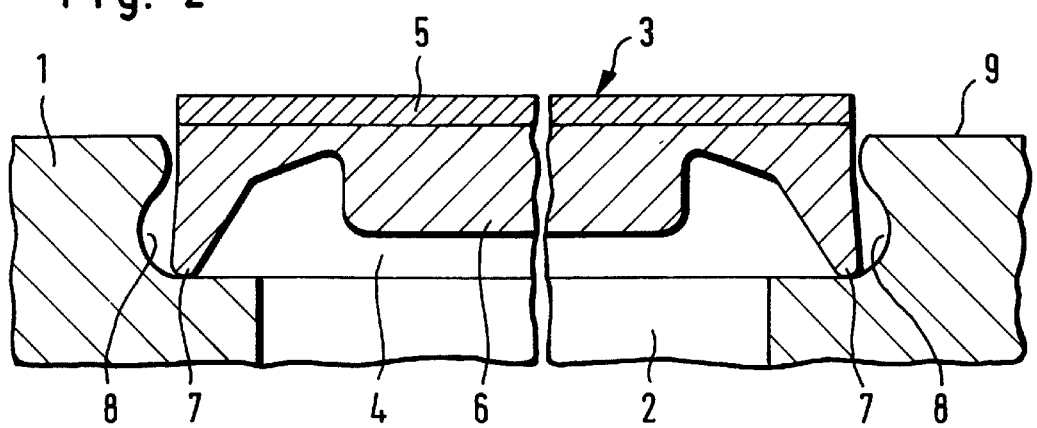
FIG. 2 shows a cross section through the cover band along line II—II in FIG. 1, with the cover band partially inserted into a guide rail.
Figure 1:
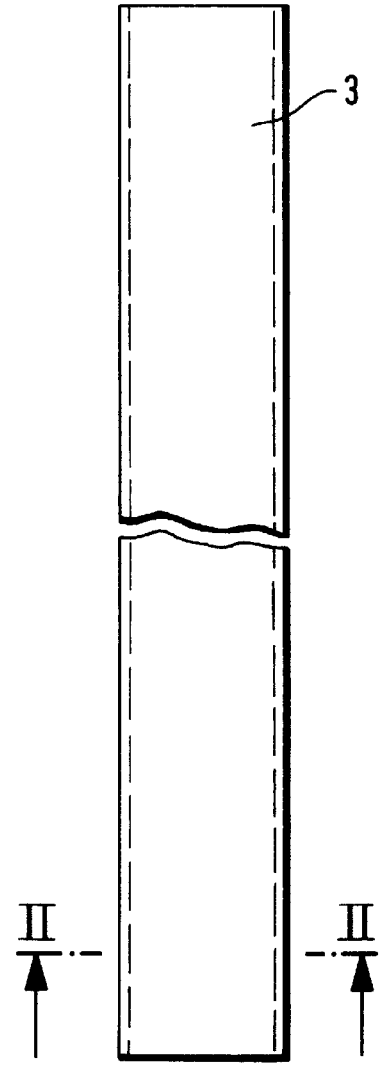
FIG. 1 shows a plan view of a cover band.

A cover band 3 shown in FIGS. 1 and 2 is inserted into a longitudinal groove 4 extending along the guide rail 1. The cover band is comprised of an outer layer 5 and an inner layer 6. Material lips 7 directed toward the base of the longitudinal groove 4 are formed on the two longitudinal sides of the inner layer 6. The bottom layer 6 bears against the top layer 5 of the cover band 3. The two layers are fastened together by cold roll bonding.

Concave undercuts 8 are formed at the two inner, longitudinal sides of the guide rail 1 which define the longitudinal groove 4. The material lips 7 are pressed into these undercuts 8 and are reshaped when the cover band 3, which had been partially inserted into the longitudinal groove 4, is arranged completely inside the longitudinal groove 4 by rolling the cover band into place. In this state, the cover band 3 is held in the guide rail 1 by positive locking in the regions of the undercuts 8. Further, the outer surface of the cover band 3 now lies in the plane of a top wiping surface 9 of the guide rail 1.

Figure 3:
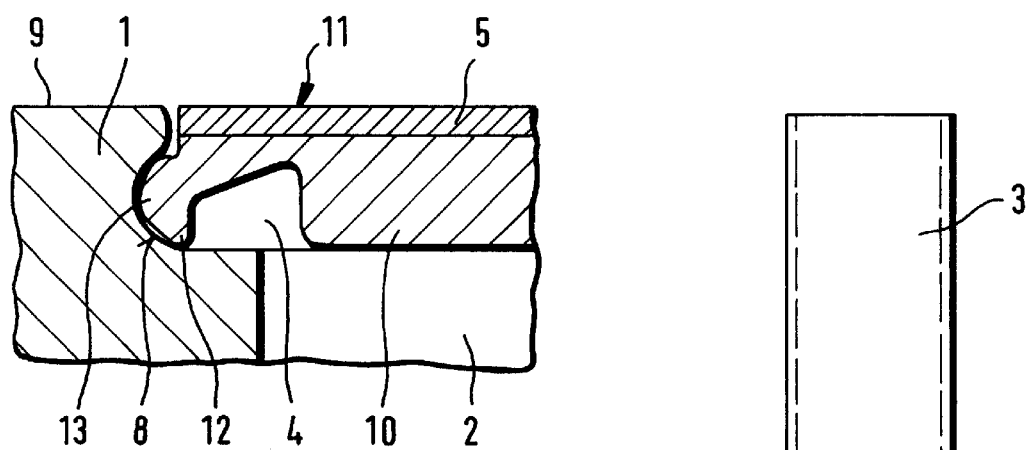
FIG. 3 shows a partial cross section corresponding to FIG. 2 through a further cover band.

The embodiment in FIG. 3 differs from the cover band 3 embodiment of FIG. 2 only in that the inner layer 10 of the cover band 11 has two retaining strips 12 which are formed on its longitudinal sides and in cooperation with convexly arched portions 13 in the regions of the undercuts 8, the strips bear in a positive-locking manner against the guide rail 1 inside the longitudinal groove 4.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An arrangement of a cover band on a linear guide, wherein the arrangement comprises:
   a longitudinally extending guide rail having a surface in which a longitudinal groove is formed and along which the groove extends; the longitudinal groove in the rail having opposed separated lateral groove walls which define the groove;
   a cover band for being installed in the groove in the guide rail; the cover band having two separated longitudinally extending retaining strips extending in the longitudinal direction of the guide rail and the retaining strips being positioned on the cover band to be inserted in the groove in the guide rail and to bear against the lateral groove walls of the longitudinal groove;
   the cover band being comprised of an outer layer which faces outwardly and is a facing layer of the cover band and an inner layer inward of the outer layer, the inner layer including the retaining strips, the inner layer bearing against the outer layer;
   the outer layer and the inner layer being respectively of two different materials which are inseparably connected to each other mechanically by cold roll bonding.

2. The arrangement of claim 1, wherein the guide rail has a plurality of holes therethrough which are closed by the cover band installed in the groove.

3. The arrangement of claim 1, wherein the surface of the guide rail and the facing layer of the cover band are so shaped and the cover band is so shaped and of such size that with the cover band installed in the longitudinal groove, the facing layer of the cover band relative to the surface of the guide rail being arranged in the plain of a wiping surface of the guide rail.

4. The arrangement of claim 1, wherein the outer layer is of a corrosion resistant steel.

5. The arrangement of claim 4, wherein the inner layer is made of a material which has a lower yield strength than the outer steel layer.

6. The arrangement of claim 4, wherein the inner layer is of aluminum.

7. The arrangement of claim 1, wherein each lateral groove wall of the guide rail includes an undercut having a concave cross section for accommodating material of the inner layer of the cover band when the cover band is installed in the longitudinal groove.

8. The arrangement of claim 7, wherein the retaining strips for the cover band are on the inner layer and the retaining strips are lips of the material of the inner layer.

9. The arrangement of claim 8, wherein the lips are deformable to be displaced into the lateral groove walls of the longitudinal groove to serve as the retaining strips in the longitudinal groove, wherein the arrangement is provided by partly inserting the cover band into the longitudinal groove and then completely rolling the band into place for deforming the lips against the lateral groove walls.

10. The arrangement of claim 7, wherein the retaining strips of the inner layer of the cover band are adapted to be snapped into position in the guide rail and the guide rail being so shaped with respect to the lateral strips that the lateral strips of the cover band are snapped into the longitudinal groove of the guide rail upon the cover band being installed in the longitudinal groove of the guide rail.

11. The arrangement of claim 1, wherein the lateral groove walls include undercuts defined therein and the retaining strips of the cover band being deformed into the undercuts for locking the cover band to the lateral groove walls and the guide rail.

12. The arrangement of claim 1, wherein the retaining strips of the inner layer of the cover band are adapted to be snapped into position in the guide rail and the guide rail being so shaped with respect to the lateral strips that the lateral strips of the cover band are snapped into the longitudinal groove of the guide rail upon the cover band being installed in the longitudinal groove of the guide rail.

13. The arrangement of claim 12, wherein the retaining strips include convexly arched portions, and the lateral groove walls include undercuts defined therein which receive the arched portions of the retaining strips to act as flexible snap lips when the cover band is snapped into the longitudinal groove.

14. The arrangement of claim 1, wherein the inner layer is made of pure aluminum.

* * * * *